United States Patent [19]

Stamoutsos

[11] Patent Number: 5,125,712
[45] Date of Patent: Jun. 30, 1992

[54] FRONT COVER FOR A BABY STROLLER

[76] Inventor: William G. Stamoutsos, 35 Sylvia Ter., Middletown, N.J. 07748

[21] Appl. No.: 788,615

[22] Filed: Nov. 6, 1991

[51] Int. Cl.⁵ .................................................. B60J 9/00
[52] U.S. Cl. ................................. 296/77.1; 280/1.13; 280/47.38
[58] Field of Search ................... 296/77.1, 78.1; 280/47.38, 1.13, 1.16

[56] References Cited

U.S. PATENT DOCUMENTS

| | | | |
|---|---|---|---|
| 3,873,117 | 3/1975 | Perego | 280/47.38 |
| 4,582,355 | 4/1986 | Hall | 296/77.1 |
| 4,846,521 | 7/1989 | Takahashi et al. | 296/77.1 |
| 5,022,666 | 6/1991 | Simon | 280/1.13 |

Primary Examiner—Robert R. Song
Attorney, Agent, or Firm—Ezra Sutton

[57] ABSTRACT

A front cover for a baby stroller in the shape of a character or toy having an inner hollow compartment for receiving the baby's legs and feet and straps for removably connecting the front cover to the stroller.

5 Claims, 2 Drawing Sheets

FRONT COVER FOR A BABY STROLLER

FIELD OF THE INVENTION

The present invention relates to baby strollers and more particularly to a cover for the front of a baby stroller.

BACKGROUND OF THE INVENTION

Covers for the front of baby carriages or strollers are known in the art. However, none are in the shape of a toy or character, and none are easily removable from the stroller.

Accordingly, it is an object of the present invention to provide a cover which overcomes the drawbacks of the prior devices.

SUMMARY OF THE INVENTION

In accordance with the principles of the present invention, there is provided a front cover for a baby stroller having the shape of a character or toy, wherein the baby stroller includes a seat on which to place a baby, a leg rest for the baby's legs pivotally connected to the seat and movable between an upper horizontal position and a lower inclined position, first and second front support members connected to first and second front wheels, and a horizontally-extending front guard member connected to the first and second front support members.

The front cover includes an exterior surface in the shape of a character or toy which extends from the front guard member to below the leg rest when the leg rest is in the lower inclined position, an inner hollow compartment for receiving the legs and feet of a baby, the inner hollow compartment being of sufficient size to allow the leg rest to pivot between the upper and lower positions within the hollow compartment, upper straps connected to the upper section of the front cover for removably attaching the front cover to the horizontal front guard member, first side straps connected to the first side of the front cover for removably attaching the front cover to the first front support member, and second side straps connected to the second side of the front cover for removably attaching the front cover to the second front support member.

In the preferred embodiments, the exterior surface may be in the shape of a motorcycle, a bicycle, a car, a bear, an elephant, or a cartoon character.

BRIEF DESCRIPTION OF THE DRAWINGS

Further objects, features, and advantages of the present invention will become apparent upon consideration of the detailed description of the presently-preferred embodiment, when taken in conjunction with the accompanying drawings wherein.

DETAILED DESCRIPTION OF THE PREFERRED EMBODIMENTS

Figure 1:
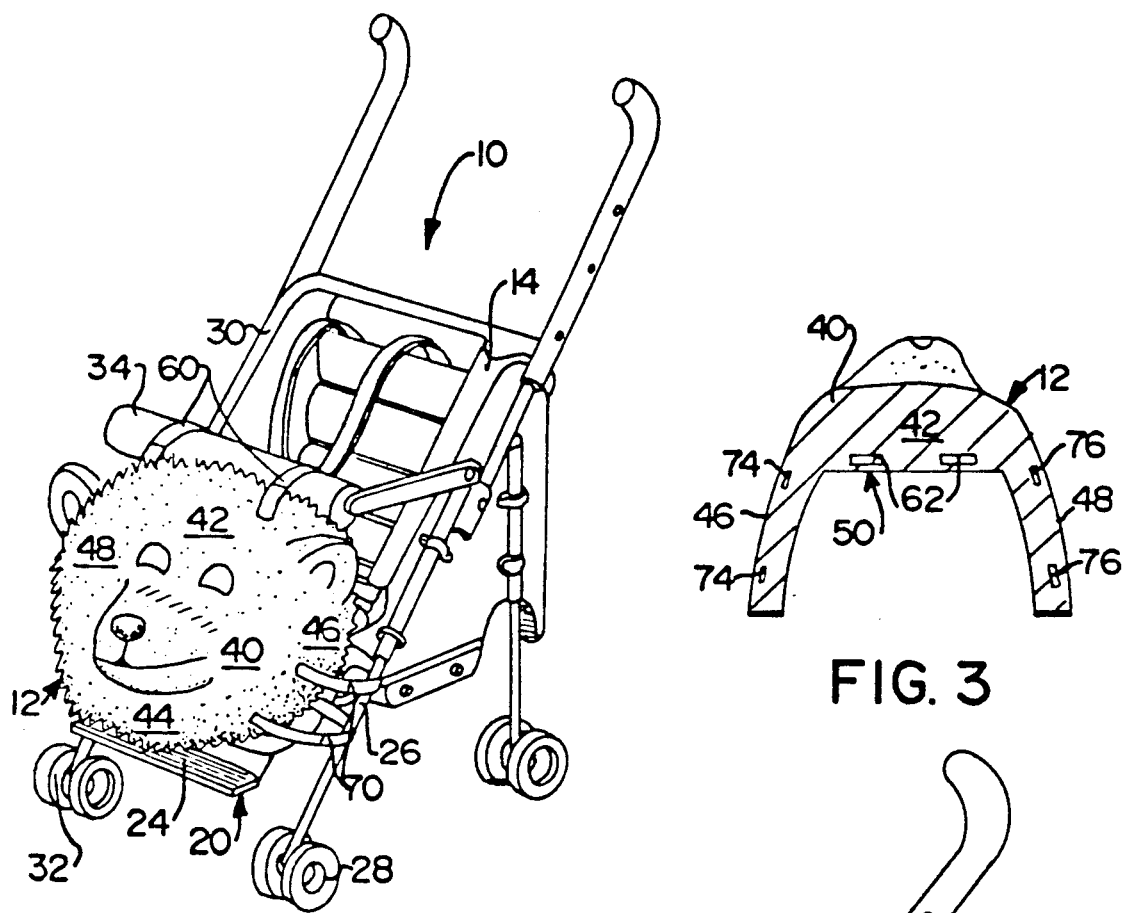
FIG. 1 is a perspective view of a stroller having a cover in accordance with the present invention.

In FIG. 1, there is shown a stroller 10 having a front cover 12 in accordance with the present invention. The stroller 10 includes a baby seating area 14 having a seat 16 for a baby and a leg rest 20 for the baby's legs and feet. The leg rest 20 is pivotally connected to the seat 16 in a conventional manner and includes a leg supporting area 22 and a foot rest 24. The leg rest is movable between an upper horizontal position and a lower inclined position.

The stroller 10 further includes a first front support member 26 connected to wheels 28 and a second front support member 30 connected to wheels 32. Stroller 10 also includes a horizontally-extending front guard member 34 connected to the front support members 26 and 30.

Figures 4, 6:
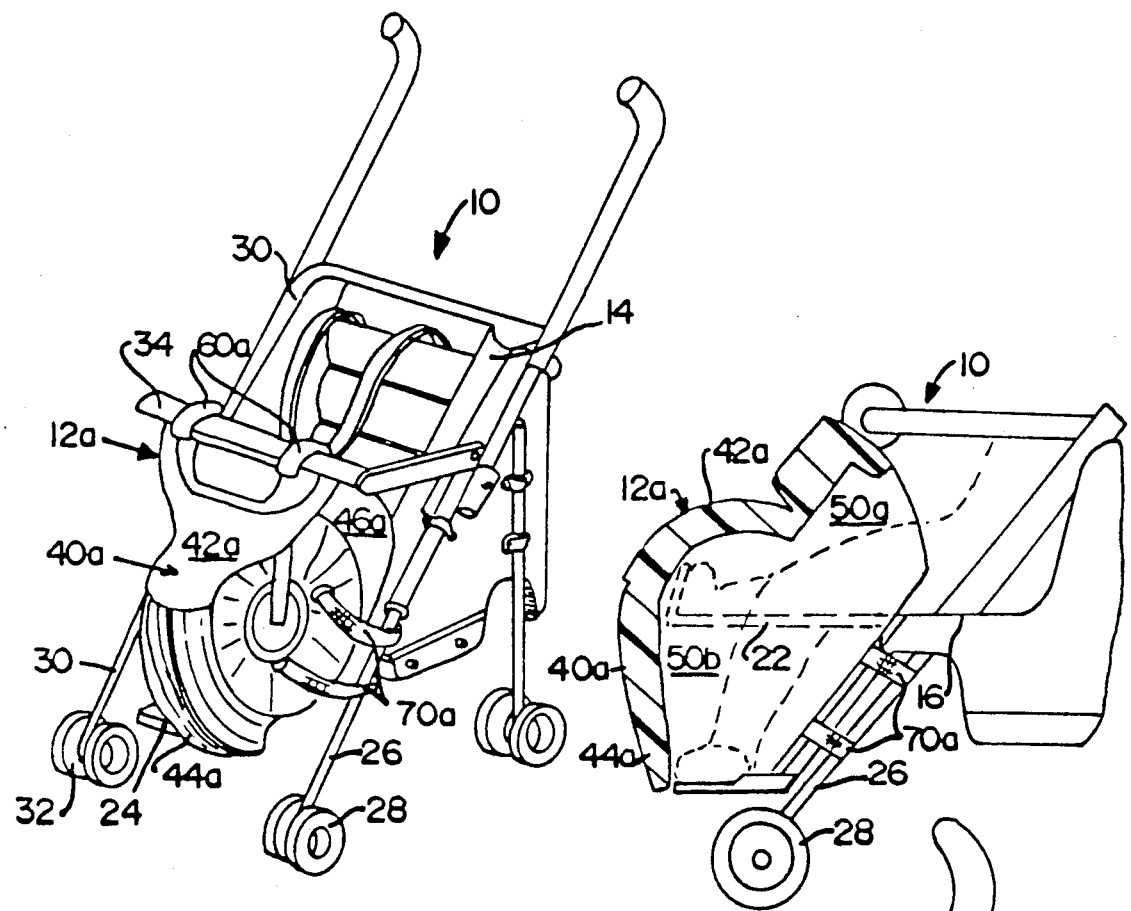
FIG. 4 is a perspective view of another embodiment of a cover in accordance with the present invention.
FIG. 6 is a cross-sectional view of FIG. 4.

The front cover 12 has an exterior surface 40 which may be in the shape of any character or toy. For example, the shape can be a bear, as shown in FIG. 1, or a motorcycle, as shown in FIG. 4, or other toy shapes, such as bicycles or cars, or other characters, such as a cartoon character, a duck, or an elephant. It is understood that these are merely representative examples and are not limiting in any way.

The exterior surface 40 includes an upper section 42, a lower section 44, and side sections 46 and 48. The upper section 42 is adjacent the horizontal guard member 34, and the lower section 44 extends below the foot rest 24 when its in its lowermost position.

The front cover 12 includes an inner hollow compartment 50 for comfortably receiving the legs and feet of a baby and being of sufficient size to allow the leg rest 20 to pivot between upper compartment 50a and lower compartment 50b within the hollow compartment 50.

Preferably, front cover 12 is molded from plastic into the desired shape and configuration, but other materials and methods of manufacture may be used.

Upper straps 60 are provided and are connected to the upper section 42 of the front cover 12 for removably attaching the front cover to the horizontal guard member 34. Upper straps 60 are adapted to pass through upper slots 62 which are molded into the upper section 42 and then around guard member 34, as shown in the drawings. Upper straps 60 may be closed with Velcro closures, snaps, or any other suitable fasteners.

Side straps 70 and 72 are provided and are connected to the side sections 44 and 46 of the front cover 12 for removably attaching the front cover 12 to the front support members 26 and 30, respectively. Side straps 70 and 72 are adapted to pass through respective side slots 74 and 76, which are molded into the side sections 46 and 48 and then around respective front support members 26 and 30, as shown in the drawings. Side straps 70 and 72 may be closed with Velcro closures, snaps, or any other suitable fasteners.

Figure 3:
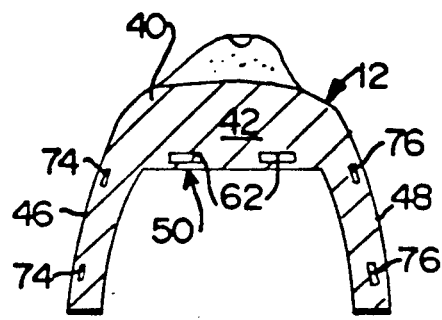
FIG. 3 is a cross sectional view of the cover.
Figure 2:
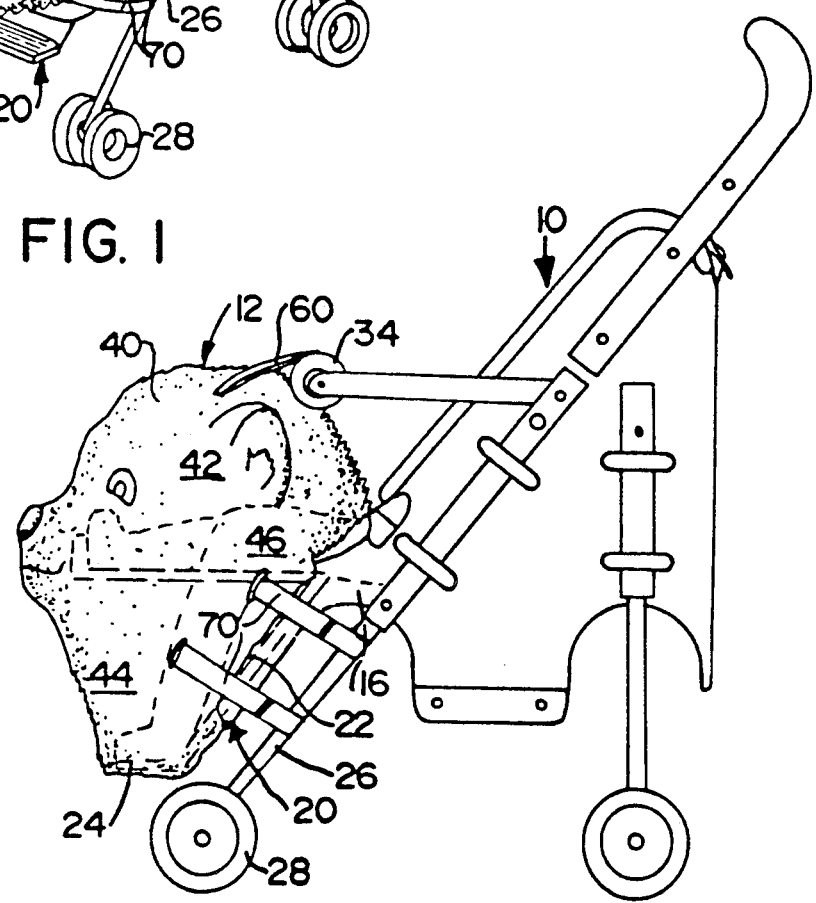
FIG. 2 is a side view thereof.
Figure 5:
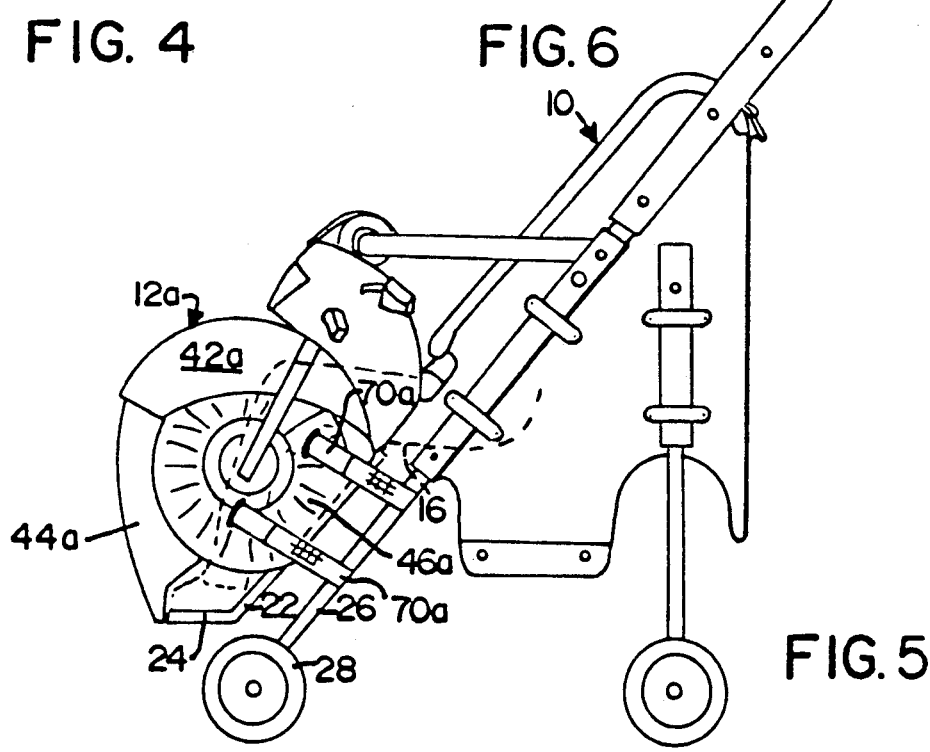
FIG. 5 is a side view thereof.

FIGS. 4, 5, and 6 show another embodiment of the cover, designated as 12a, on the same stroller 10. In FIGS. 4, 5, and 6, the reference numerals include an "a" to refer to the same reference numerals and parts in FIGS. 1, 2, and 3.

Advantageously, as a result of the present invention, there has been provided a cover which may be in any desired shape and which comfortably accommodates the body's feet and legs and which is easily removable from the stroller.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope and of the invention herein.

What is claimed is:

1. A front cover for a baby stroller having the shape of a character or toy, wherein the baby stroller includes a seat on which to place a baby, a leg rest for the baby's legs pivotally connected to said seat and movable between an upper horizontal position and a lower inclined position, first and second front support members connected to first and second front wheels, and a horizontally-extending front guard member connected to said first and second front support members, said front cover comprising:

a) an exterior surface in the shape of a character or toy and extending from said front guard member to below said leg rest when said leg rest is in said lower inclined position;

b) an inner hollow compartment for receiving the legs and feet of a baby;

c) said inner hollow compartment being of sufficient size to allow said leg rest to pivot between said upper and lower positions within said hollow compartment;

d) upper straps connected to the upper section of said front cover for removably attaching said front cover to said horizontal front guard member;

e) first side straps connected to the first side of said front cover for removably attaching said front cover to said first front support member; and f) second side straps connected to the second side of said front cover for removably attaching said front cover to said second front support member.

2. A front cover in accordance with claim 1, wherein said exterior surface is in the shape of a motorcycle.

3. A front cover in accordance with claim 1, wherein said exterior surface is in the shape of a bear's face.

4. A front cover in accordance with claim 1, further including slots formed therein through which said upper straps and said side straps pass for removably attaching said front cover to said stroller.

5. A front cover in accordance with claim 1, wherein said front cover is molded from plastic.

* * * * *